(12) United States Patent
Shimizu et al.

(10) Patent No.: US 11,584,095 B2
(45) Date of Patent: Feb. 21, 2023

(54) FLEXIBLE MANDREL, AND METHOD FOR PRODUCING COMPOSITE COMPONENT

(71) Applicant: MITSUBISHI HEAVY INDUSTRIES, LTD., Tokyo (JP)

(72) Inventors: Takayuki Shimizu, Tokyo (JP); Akihisa Okuda, Tokyo (JP); Ryota Ozaki, Tokyo (JP); Shoya Mano, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 294 days.

(21) Appl. No.: 16/624,409

(22) PCT Filed: Jul. 13, 2018

(86) PCT No.: PCT/JP2018/026574
§ 371 (c)(1),
(2) Date: Dec. 19, 2019

(87) PCT Pub. No.: WO2019/026594
PCT Pub. Date: Feb. 7, 2019

(65) Prior Publication Data
US 2020/0180244 A1 Jun. 11, 2020

(30) Foreign Application Priority Data

Aug. 3, 2017 (JP) .............................. JP2017-150650

(51) Int. Cl.
*B29C 70/44* (2006.01)
*B29C 43/12* (2006.01)
(Continued)

(52) U.S. Cl.
CPC .......... *B29C 70/44* (2013.01); *B29C 33/3842* (2013.01); *B29D 99/0003* (2013.01);
(Continued)

(58) Field of Classification Search
CPC . B29C 70/54; B29C 33/3842; B29K 2663/00; B29K 2705/00; B29L 2031/757
See application file for complete search history.

(56) References Cited

U.S. PATENT DOCUMENTS

| 5,114,332 A | * | 5/1992 | Benoit | .................... | B28B 3/025 |
| | | | | | 156/583.1 |
| 5,615,469 A | | 4/1997 | Jensen et al. | | |

(Continued)

FOREIGN PATENT DOCUMENTS

| JP | H10156832 A | 6/1998 |
| JP | 2008521645 A | 6/2008 |

(Continued)

OTHER PUBLICATIONS

Title: Innovations in washout tooling to lower cost, shorten lead times, and improve properties, Publisher: "Society for the Advancement of Material and Process Engineering (SAMPE)." (Year: 2011).*

(Continued)

*Primary Examiner* — Seyed Masoud Malekzadeh
*Assistant Examiner* — John W Hatch
(74) *Attorney, Agent, or Firm* — Kanesaka Berner and Partners LLP

(57) ABSTRACT

This flexible mandrel for molding a composite material containing a thermosetting resin includes: a main body containing a first material; and a thermally conductive layer containing a second material having a higher thermal conductivity than the first material, the thermally conductive layer being formed so as to cover at least a portion of the main body. The thermally conductive layer extends from a contacting surface of the flexible mandrel, which comes into contact with the composite material during molding, to a non-contacting surface which does not come into contact with the composite material.

7 Claims, 6 Drawing Sheets

(51) Int. Cl.
  *B29C 43/36* (2006.01)
  *B29C 33/38* (2006.01)
  *B29D 99/00* (2010.01)
  *B29K 663/00* (2006.01)
  *B29K 705/00* (2006.01)
  *B29L 31/00* (2006.01)

(52) U.S. Cl.
  CPC ...... *B29K 2663/00* (2013.01); *B29K 2705/00* (2013.01); *B29L 2031/757* (2013.01)

(56) References Cited

U.S. PATENT DOCUMENTS

| | | | |
|---|---|---|---|
| 5,817,267 A | 10/1998 | Covino et al. | |
| 7,357,166 B2 | 4/2008 | Pham et al. | |
| 2002/0130432 A1* | 9/2002 | Lukas | B29C 35/02 264/40.6 |
| 2002/0150645 A1 | 10/2002 | Covino | |
| 2006/0108057 A1* | 5/2006 | Pham | B29C 70/446 156/583.1 |
| 2006/0162143 A1* | 7/2006 | Nelson | B29C 70/202 29/431 |
| 2010/0136278 A1* | 6/2010 | Cadd | B29C 66/1286 428/157 |
| 2011/0012287 A1* | 1/2011 | Toledo | B29C 33/3842 264/226 |
| 2013/0092323 A1* | 4/2013 | Pham | B29D 99/0007 156/256 |
| 2015/0367544 A1* | 12/2015 | Asaka | B29C 45/14 425/129.1 |

FOREIGN PATENT DOCUMENTS

| | | |
|---|---|---|
| JP | 2008280432 A | 11/2008 |
| JP | 4896035 B2 | 3/2012 |
| JP | 2012131080 A | 7/2012 |
| JP | 2014532000 A | 12/2014 |

OTHER PUBLICATIONS

Carbon Fiber Properties—Heat Conductivity (Year: 2022).*
Title: Convection Heat Transfer (4th Edition), Author: Bejan, Adrian, Publisher: John Wiley & Sons (Year: 2013).*
International Search Report of International Application No. PCT/JP2018/026574 dated Aug. 28, 2018; 12pp.
Written Opinion of the International Searching Authority of International Application No. PCT/JP2018/026574 dated Dec. 12, 2019; 15pp.
Extended European Search Report for European Application No. 18841011.2 dated May 4, 2020; 12pp.

* cited by examiner

FLEXIBLE MANDREL, AND METHOD FOR PRODUCING COMPOSITE COMPONENT

RELATED APPLICATIONS

The present application is a National Phase of International Application Number PCT/JP2018/026574 filed Jul. 13, 2018 and claims priority to Japanese Application Number 2017-150650 filed Aug. 3, 2017.

TECHNICAL FIELD

The present disclosure relates to a flexible mandrel used for molding composite components and a method for producing composite components using the flexible mandrel.

BACKGROUND

Composite materials represented by carbon fiber reinforced plastic (CFRP) have excellent strength and rigidity as compared to general metallic materials and are often used in structures of aircrafts, space apparatuses, and the like requiring light weight. In CFRP, a thermosetting resin such as an epoxy resin is mainly used, and composite materials are molded by curing the same in a high-temperature and high-pressure container called an autoclave.

An example of such a composite component is a stringer for reinforcing a sheet member used in aircrafts. A stringer has a complex shape including a contour and a twist according to airframe design and has an I-type cross-sectional shape, for example. Such a stringer is molded in such a way that after a semi-cured soft CFRP sheet (a composite material) is stacked between a pair of mandrels which is a mold, an entire assembly is surrounded by a vacuum bag to exhaust air included therein and a curing process is performed in a state where the composite material is in close contact with the mandrels.

Patent Document 1 discloses that by forming a groove in a depth direction of a metallic mandrel used for molding such a stringer, it is possible to realize satisfactory flexibility and cope with a complex shape (a contour or a twist).

CITATION LIST

Patent Literature

Patent Document 1: JP4896035B

SUMMARY

Technical Problem

A mandrel used for molding a composite material containing a thermosetting resin as in Patent Document 1 has a larger heat capacity than the composite material which is a molding target. Due to this, when a curing process is performed on a composite material which is a molding target, a considerable amount of time is required for increasing the temperature sufficiently, which results in an increase in cost due to decrease in a component production rate and increase in the electricity consumed by the curing process.

A mandrel itself used for molding a composite component having a complex shape like a stringer is sometimes formed of light-weight and flexible CFRP. In this case, it is necessary to solve the above-described problems while securing flexibility of the mandrel itself.

At least one embodiment of the present invention has been made in view of the above-described problems, and an object thereof is to provide a flexible mandrel and method for producing composite components, capable of improving a component production rate and decreasing the cost by accelerating temperature rise during curing of composite materials containing a thermosetting resin while securing satisfactory flexibility.

Solution to Problem (1) In order to solve the problems, a flexible mandrel according to at least one embodiment of the present invention is a flexible mandrel for molding a composite material containing a thermosetting resin, including: a main body containing a first material; and a thermally conductive layer containing a second material having a higher thermal conductivity than the first material, the thermally conductive layer being formed so as to cover at least a portion of the main body, in which the thermally conductive layer extends from a contacting surface of the flexible mandrel, which comes into contact with the composite material during molding, to a non-contacting surface which does not come into contact with the composite material.

According to the configuration of (1), at least a portion of the main body containing the first material is covered by the thermally conductive layer containing the second material having a higher thermal conductivity than the first material. Since such a thermally conductive layer extends from the contacting surface to the non-contacting surface, the heat supplied from the outside during a curing process is effectively transmitted to the composite material which is a molding target via the thermally conductive layer. Therefore, it is possible to shorten the time required for increasing the temperature during a curing process, improve a component production rate, and achieve a cost reduction.

(2) In some embodiments, in the configuration of (1), the thermally conductive layer surrounds an entire circumferential direction of the main body.

According to the configuration of (2), it is possible to transmit the heat supplied from the outside during a curing process to the composite material more effectively.

(3) In some embodiments, in the configuration of (1) or (2), the second material is a PITCH-based CFRP.

According to the configuration of (3), the PITCH-based CFRP is used as the second material that forms the thermally conductive layer. Although a PITCH-based CFRP is a relatively expensive material, since the thermally conductive layer is thinner than the main body, it is possible to realize efficient heat conduction while suppressing the cost.

(4) In some embodiments, in the configuration of (3), the PITCH-based CFRP has a fiber direction extending from the contacting surface toward the non-contacting surface.

The thermal conductivity of the PITCH-based CFRP has anisotropy and exhibits excellent thermal conductivity in the fiber direction. According to the configuration of (4), since the PITCH-based CFRP contained in the thermally conductive layer has a fiber direction extending from the contacting surface toward the non-contacting surface, the heat supplied from the outside during a curing process is effectively transmitted to the composite material which is a molding target.

(5) In some embodiments, in the configuration of (1) or (2), the second material is a metal.

According to the configuration of (5), a metal having a satisfactory thermal conductivity may be used as the second material contained in the thermally conductive layer. In this case, the thickness of the metal contained in the thermally conductive layer may be set to such a thickness that does not hinder the flexibility required during molding.

(6) In some embodiments, in the configuration of at least one of (1) to (5), the first material is a PAN-based CFRP.

According to the configuration of (6), a relatively inexpensive PAN-based CFRP having satisfactory flexibility is used as the first material that forms the main body that occupies a large part of the volume of the flexible mandrel.

(7) In some embodiments, in the configuration of at least one of (1) to (6), the thermally conductive layer has a thickness smaller than 2 mm.

According to the configuration of (7), by setting the thickness of the thermally conductive layer to the above-described range, it is possible to shorten the time required for the thermally conductive layer to increase the temperature while securing sufficient flexibility required for the mandrel.

(8) In some embodiments, in the configuration of at least one of (1) to (7), at least one hole is formed toward an inner side of the main body.

According to the configuration of (8), by forming the hole in the main body of the flexible mandrel, the heat capacity of the flexible mandrel is decreased. In this way, it is possible to further shorten the time required for increasing the temperature during a curing process.

(9) In some embodiments, in the configuration of (8), the hole is provided on a side of the main body close to the non-contacting surface.

According to the configuration of (9), by forming the hole in the non-contacting surface that does not come into contact with the composite material during molding, it is possible to reduce the heat capacity of the flexible mandrel while securing a contact state between the contacting surface and the composite material and securing satisfactory heat conduction on the contacting surface to thereby shorten the time required for increasing the temperature during a curing process more effectively.

(10) In some embodiments, in the configuration of (8) or (9), the flexible mandrel further includes a filling material filling the hole, and the filling material has a higher thermal conductivity than the first material.

According to the configuration of (10), since a filler having a higher thermal conductivity than the main body fills the hole as a filling material, it is possible to further improve the thermal conductivity of the flexible mandrel. In this case, it is possible to realize increase in temperature during a heating and curing process more quickly.

(11) In order to solve the problems, a method for producing composite components according to at least one embodiment of the present invention is a method for producing a composite component by molding a composite material containing a thermosetting resin using a pair of flexible mandrels, the method including: forming a main body of the flexible mandrel using a first material; forming a thermally conductive layer so as to cover at least a portion of the main body using a second material having a higher thermal conductivity than the first material until the thermally conductive layer extends from a contacting surface of the flexible mandrel, which comes into contact with the composite material during molding, to a non-contacting surface which does not come into contact with the composite material; and performing a curing process with the composite material disposed between the flexible mandrels in which the thermally conductive layer is formed.

According to the method of (11), by using the above-described flexible mandrel (including the above-described respective embodiments), it is possible to accelerate increase in temperature when performing a curing process on a composite material containing a thermosetting resin while securing satisfactory flexibility.

(12) In some embodiments, the method of (11) further includes forming a hole toward an inner side of the main body before forming the thermally conductive layer in the main body.

According to the method of (12), by forming the thermally conductive layer after forming the hole in the main body, it is possible to produce a flexible mandrel capable of transmitting heat more effectively when performing a curing process on a composite material containing a thermosetting resin.

(13) In some embodiments, in the method of (11) or (12), the thermally conductive layer is formed by spraying a metallic material.

According to the method of (13), when the thermally conductive layer is formed from a metallic material, it is possible to suitably form the thermally conductive layer having flexibility required as specifications of a mandrel by spraying the metallic material.

Advantageous Effects

According to at least one embodiment of the present invention, it is possible to provide a flexible mandrel and method for producing composite components, capable of improving a component production rate and decreasing the cost by accelerating temperature rise during curing of composite materials containing a thermosetting resin while securing satisfactory flexibility.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Furthermore, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

In the following embodiment, as an example of a composite material, a carbon fiber reinforced plastic (CFRP) which is a carbon fiber reinforced with resin and contains a thermosetting resin such as unsaturated polyester, vinyl ester, phenol, cyanate ester, and polyimide as well as an epoxy resin mainly and which can be molded by a curing process will be described.

A glass fiber, a boron fiber, an aramid fiber, and the like in addition to the carbon fiber can be similarly used as the reinforced fiber of a composite material.

In the following description, although a stringer for reinforcing a sheet member used in aircrafts is illustrated as a composite component obtained by molding a composite material, the composite component can be used in various components within the scope of the same technical idea. Particularly, the composite component can be used in structures of aircrafts, space apparatuses, and the like requiring light weight as well as strength and rigidity.

(Flexible Mandrel)

Figure 1:
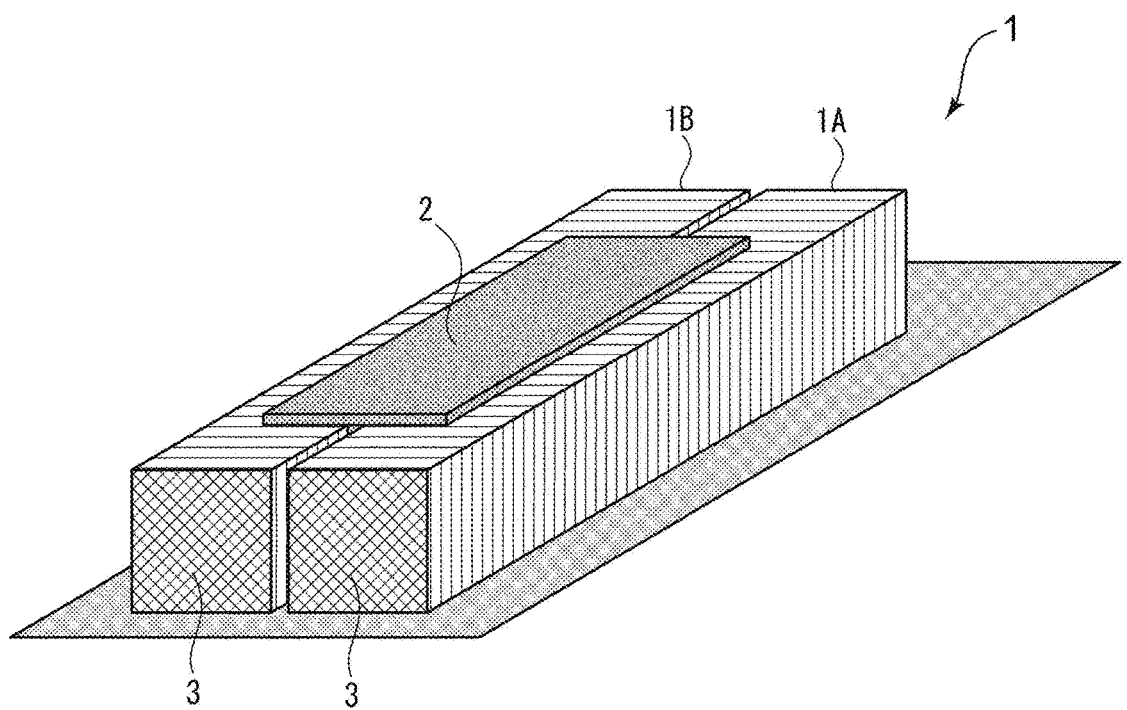
FIG. 1 is a perspective view illustrating a flexible mandrel according to at least one embodiment of the present invention.
Figure 2:
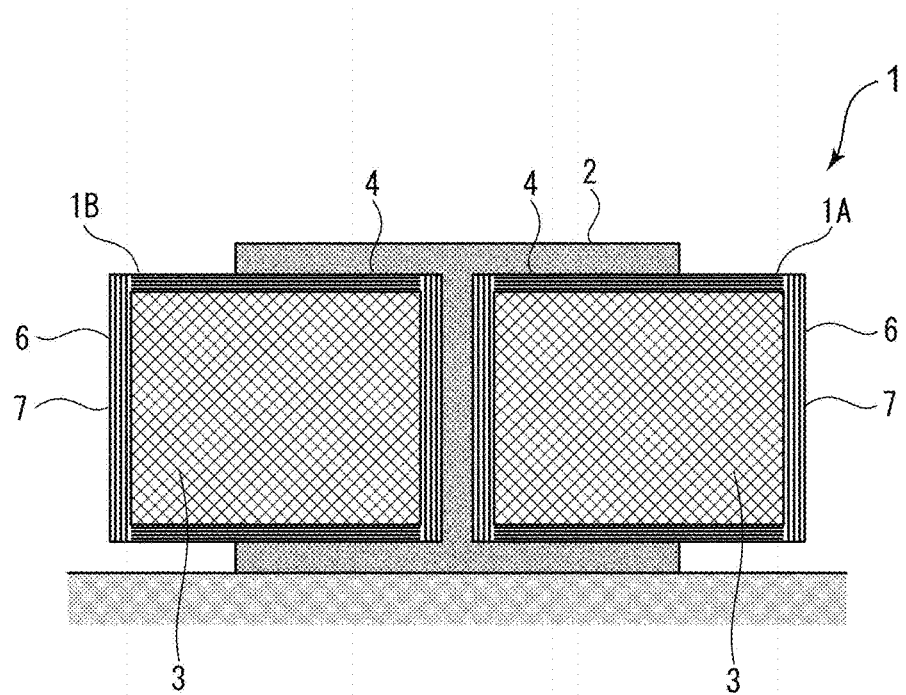
FIG. 2 is a cross-sectional view of FIG. 1.

First, a configuration of a flexible mandrel used for molding composite components will be described. FIG. 1 is a perspective view illustrating a flexible mandrel 1 according to at least one embodiment of the present invention and FIG. 2 is a cross-sectional view of FIG. 1. FIGS. 1 and 2 illustrate a composite component 2 which is a molding target object together with a pair of flexible mandrels 1 having the same shape (hereinafter, the respective flexible mandrels will be referred to as a "first flexible mandrel 1A" and a "second flexible mandrel 1B", respectively, when they are distinguished from each other).

The flexible mandrel 1 is a mold for molding the composite component 2 and has a shape corresponding to the composite component 2 which is a molding target object. In the present embodiment, an aircraft stringer having an I-type cross-section and a shape extending in a longitudinal direction is illustrated as an example of the composite component 2. The first flexible mandrel 1A and the second flexible mandrel 1B have the same shape, and FIG. 1 illustrates a state in which a composite material serving as a material of the composite component 2 is disposed between the flexible mandrels and molding is performed.

The flexible mandrel 1 includes a main body 3 and a thermally conductive layer 7 formed so as to cover at least a portion of the main body 3. The main body 3 is a mold for molding the composite component 2 and has a shape corresponding to the composite component 2 which is a molding target object. In the present embodiment, an aircraft stringer having an I-type cross-section and a shape extending in a longitudinal direction is illustrated as an example of the composite component 2. The first flexible mandrel 1A and the second flexible mandrel 1B have the same shape, and FIG. 1 illustrates a state in which a composite material serving as a material of the composite component 2 is disposed between the flexible mandrels and molding is performed.

As illustrated in FIG. 2, the main body 3 of the flexible mandrel 1 includes a contacting surface 4 that comes into contact with the composite component 2 with the thermally conductive layer 7 disposed therebetween and a non-contacting surface 6 that does not come into contact with the composite component 2 with the thermally conductive layer 7 disposed therebetween. Among these surfaces, the contacting surface 4 has a shape corresponding to the composite component 2 in order to mold the composite component 2 as described above, the non-contacting surface 6 may have an arbitrary shape.

The main body 3 contains a first material. The first material contains a thermally conductive material in order to transmit heat supplied from the outside to the composite component 2 when performing a curing process. Moreover, the material of the main body 3 has such flexibility that the main body 3 can be deformed according to a specification shape of the composite component 2. For example, a composite material (CFRP) can be used as the first material, and particularly, a PAN-based CFRP which is relatively inexpensive can be used.

The thermally conductive layer 7 is formed so as to cover at least a portion of the main body 3, and in the present embodiment, the thermally conductive layer 7 surrounds the entire circumferential direction of the main body 3 particularly. Such a thermally conductive layer 7 contains a second material having a higher thermal conductivity than the first material contained in the main body 3 and as illustrated in FIG. 2, extends from a contacting surface 4 of the main body 3 to a non-contacting surface 6. Since a portion of the thermally conductive layer 7 is exposed to the atmosphere, when the flexible mandrel 1 is heated in a high-temperature and high-pressure autoclave, the heat from an external atmosphere is transmitted to the composite component 2 that makes contact with the thermally conductive layer 7 with the thermally conductive layer 7 disposed therebetween. Therefore, it is possible to shorten the time required for increasing the temperature during a curing process as compared to a flexible mandrel that does not have the thermally conductive layer 7.

The thermally conductive layer 7 is formed to be thinner than the main body 3 that determines a basic shape of the flexible mandrel 1. The thickness of the thermally conductive layer 7 is preferably in such a range that does not affect a basic shape of the flexible mandrel 1 and is 2 mm or smaller, for example. A PITCH-based CFRP, for example, can be used as the second material contained in the thermally conductive layer 7. Although the PITCH-based CFRP is more expensive than the PAN-based CFRP, since the thermally conductive layer 7 is thinner than the main body 3, the cost may not increase remarkably.

When a PITCH-based CFRP is used as the second material contained in the thermally conductive layer 7, since the thermal conductivity of the PITCH-based CFRP has anisotropy with respect to a fiber direction, it is desirable that the thermally conductive layer 7 is formed so that the fiber direction extends in a direction from the contacting surface 4 toward the non-contacting surface 6. By doing so, since heat transmission in the direction from the contacting surface 4 toward the non-contacting surface 6 is improved, it is possible to improve heat transmission from an external atmosphere toward the composite component 2 more effectively.

The anisotropic thermal conductivity of the thermally conductive layer 7 extends along a surface of the main body 3 from the contacting surface 4 to the non-contacting surface 6, such that the contacting surface 4 orthogonally contacts the non-contacting surface 6 in a fiber direction of the fiber material, the fiber direction extending along the surface of the main body 3 from the contacting surface 4 toward the non-contacting surface 6.

A PITCH-based CFRP exhibits excellent durability against deformation in a fiber direction. Therefore, by forming the thermally conductive layer 7 so that the fiber direction extends in a direction from the contacting surface 4 toward the non-contacting surface 6, the thermally conductive layer 7 will not break or crack when the flexible mandrel 1 is deformed, and it is possible to flexibly cope with the deformation. That is, even when the thermally conductive layer 7 is provided in the main body 3, it is possible to secure flexibility of the flexible mandrel 1 satisfactorily.

The thermally conductive layer 7 may be formed by spraying a metallic material. Although a metallic material has higher rigidity than the PITCH-based CFRP, required flexibility can be secured by forming the metallic material as a sufficiently thin thermally conductive layer by spraying.

Figure 3:
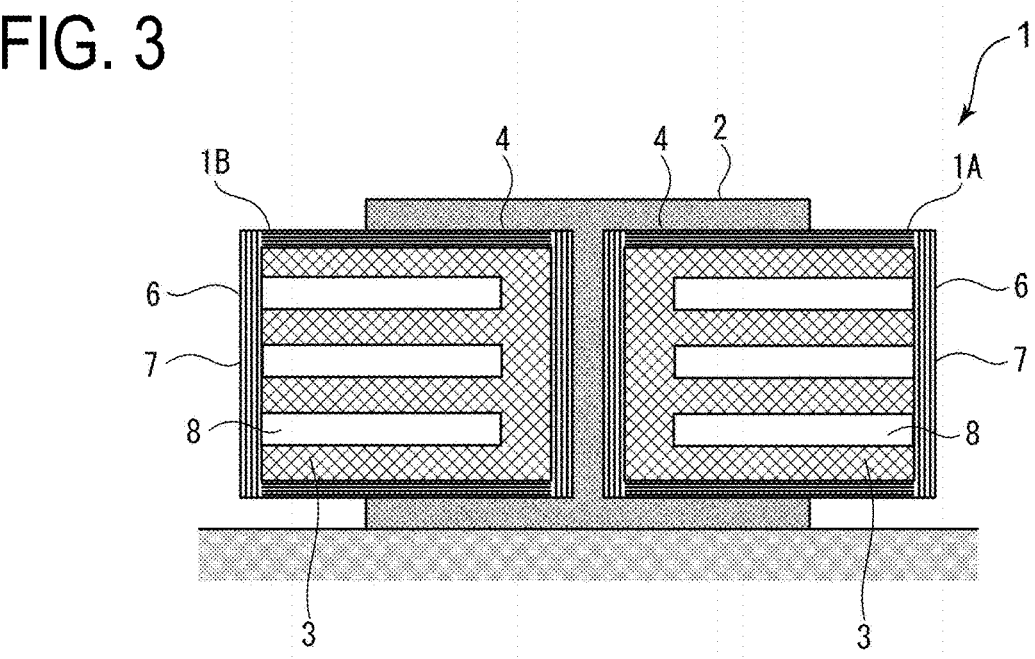
FIG. 3 is a first modification of FIG. 2.

FIG. 3 is a first modification of FIG. 2. A flexible mandrel 1 according to the first modification has at least one hole 8 formed toward an inner side of the main body 3. According to a typical example, a flexible mandrel of this type is formed of a solid bulk member. In this case, the heat capacity of a mandrel body is likely to increase as compared to the composite component 2 which is a molding target object and a considerable amount of time is required for increasing temperature during a curing process. In this respect, in the flexible mandrel 1 according to the first modification, by forming the hole 8 in the main body 3, since it is possible to decrease heat capacity of the flexible mandrel 1, it is possible to accelerate an increase in temperature during a curing process.

Here, in the first modification, the hole 8 is formed in the non-contacting surface 6 of the main body 3. Therefore, a contact state between the composite component 2 and the contacting surface 4 is secured, and heat can be transmitted to the composite component 2 satisfactorily.

The hole 8 is formed as a bottomed non-penetration hole. Although the depth of the hole 8 is arbitrary, the hole 8 has a depth that is 60% to 90% of the distance L between the contacting surface 4 and the non-contacting surface 6, for example. By setting the depth of the hole 8 to that range, it is possible to decrease the heat capacity of the flexible mandrel 1 appropriately and transmit heat to the composite component 2 satisfactorily.

The hole 8 may be formed as a penetration hole. Although the hole 8 in FIG. 3 has an approximately straight shape, the hole 8 may have a curved shape inside the main body 3, for example.

In the first modification, a plurality of holes 8 is provided. By providing a plurality of holes 8 in this manner, it is possible to decrease heat capacity effectively while securing flexibility and rigidity of the flexible mandrel 1 appropriately as compared to a case where only one hole 8 is provided.

In the first modification, a plurality of holes 8 have a uniform distribution. In a region in which the holes 8 are distributed uniformly in this manner, since the heat capacity decreases in a constant ratio in the entire region, it is possible to supply heat uniformly to the composite material during a curing process and realize molding with satisfactory quality.

A plurality of holes 8 may be formed non-uniformly. In this case, although the distribution of the holes 8 may be random, when the flexible mandrel 1 is deformed according to the shape of the composite component 2, for example, the distribution may be set according to the shape of the composite component 2 so that a predetermined temperature distribution, a stress distribution, and the like are realized. In this way, it is possible to control the heat transmitted to the composite component 2 during a curing process and realize molding with satisfactory quality.

Figure 4:
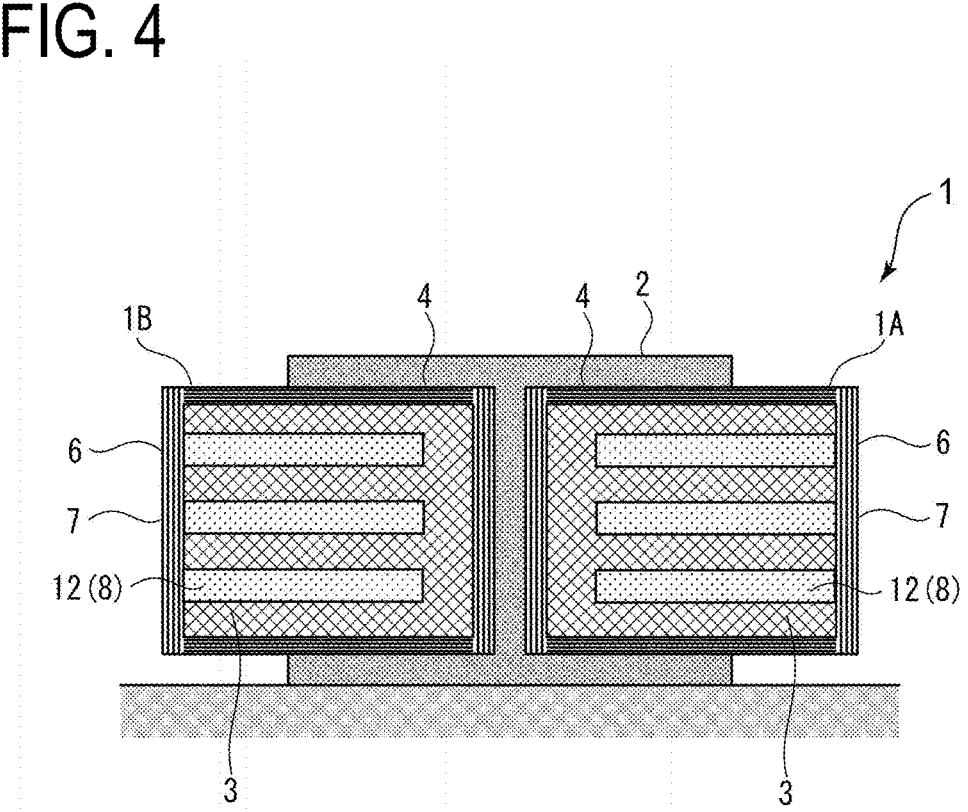
FIG. 4 is a second modification of FIG. 2.

FIG. 4 is a second modification of FIG. 2. In the second modification, a filling material 12 containing a material having a higher thermal conductivity than the main body 3 is filled in the hole 8 of the first modification. Due to the filling material 12 filled in the hole 8, it is possible to further improve the thermal conductivity of the main body 3 and increase the temperature more quickly. As a material of the filling material 12, a metal foam, for example, is useful, and specifically, a light-weight material having an excellent thermal conductivity like an aluminum foam is preferred.

(Composite Component Production Method)

Figure 5:
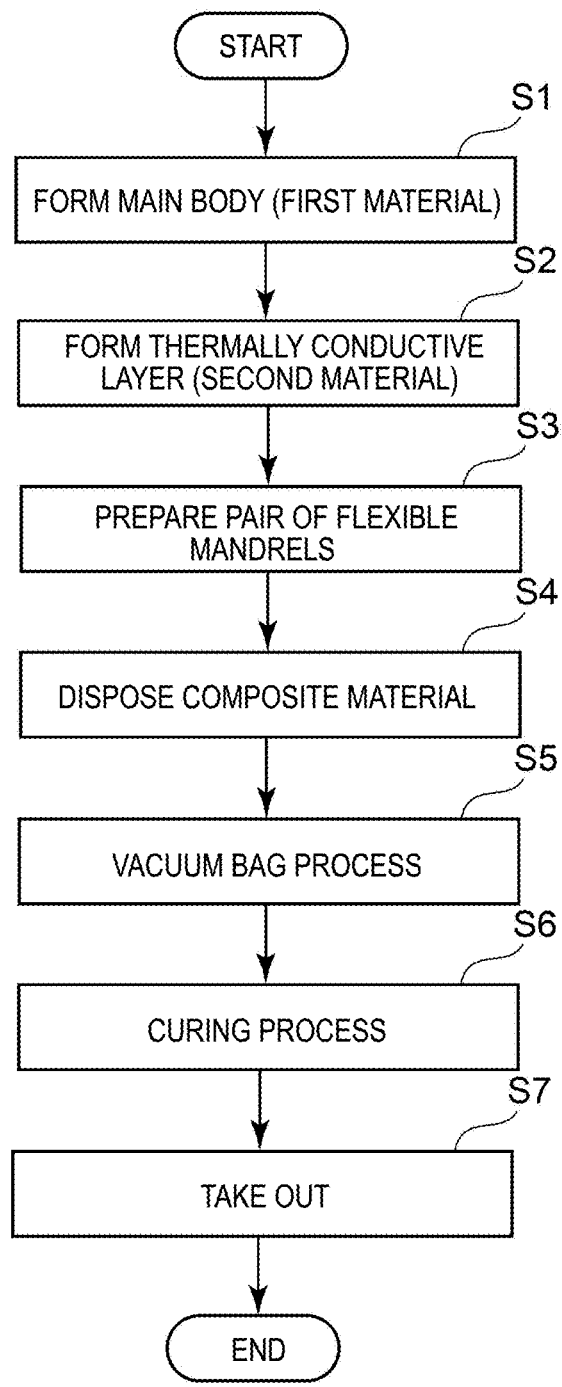
FIG. 5 is a flowchart illustrating each step of a method for producing a composite component 2 according to at least one embodiment of the present invention.

Next, a method for producing a composite component 2 using the flexible mandrel 1 having the above-described configuration will be described. FIG. 5 is a flowchart illustrating each step of a method for producing the composite component 2 according to at least one embodiment of the present invention.

First, the main body 3 of the flexible mandrel 1 is formed using a predetermined material (step S1). Here, as described above, the material of the main body 3 is a material having a thermal conductivity capable of transmitting heat supplied from the outside to the composite component 2 during a curing process and flexibility capable of deforming according to the specification shape of the composite component 2, and for example, a composite material (a PAN-based CFRP) is used. Such a main body 3 is formed as an approximately rectangular parallelepiped solid bulk body, for example.

Subsequently, the thermally conductive layer 7 is formed so as to at least partially surround the main body 3 formed in step S1 (step S2). The thermally conductive layer 7 is formed from a second material (for example, a PITCH-based CFRP) having a higher thermal conductivity than the first material contained in the main body 3. The thickness of the thermally conductive layer 7 is set to such an extent (for example, 2 mm or smaller) that does not affect a basic shape of the flexible mandrel 1. In the case of a material having an anisotropic thermal conductivity like a PITCH-based CFRP, the thermally conductive layer 7 is formed so that a fiber direction thereof extends in a direction from the contacting surface 4 toward the non-contacting surface 6.

When a metallic material is used as the second material, the thermally conductive layer 7 is formed by spraying, for example.

Here, when the hole 8 is provided in the main body 3 as in the above-described modifications (see FIGS. 3 and 4), mechanical processing such as cutting may be performed on the main body 3 before the thermally conductive layer 7 is formed in step S2. Moreover, the hole 8 may be formed simultaneously with forming of the main body 3 in step S1 (for example, the main body 3 and the hole 8 may be formed integrally).

Similarly to the second modification described above, when the filling material 12 is filled in the hole 8 formed in the main body 3, the operation of filling the filling material 12 may also be performed before forming the thermally conductive layer 7 in step S2. The filling material 12 may contain a material having a higher thermal conductivity than the main body 3, and a metal foam such as, for example, a foamed aluminum can be used.

Subsequently, molding of the composite component 2 progresses using the flexible mandrel 1 obtained in this manner. A pair of flexible mandrels 1 is prepared (step S3), and a composite material serving as a material of the composite component 2 is disposed between the flexible mandrels 1 (step S4). The composite material used herein is a semi-cured soft CFRP sheet, for example, and is combined according to the shape of the composite component 2.

Figure 6:
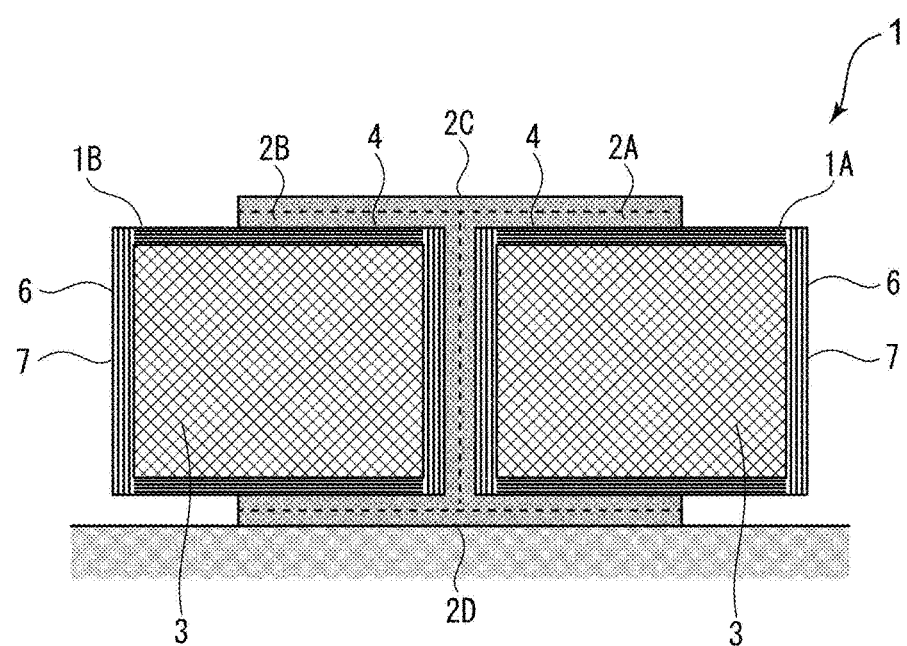
FIG. 6 is a schematic diagram illustrating a combination pattern of CFRP sheets for molding the composite component 2 having an I-type cross-section.

FIG. 6 is a schematic diagram illustrating a combination pattern of CFRP sheets for molding the composite component 2 having an I-type cross-section. When the composite component 2 having such an I-type cross-section as illustrated in FIG. 1 is molded, for example, a first sheet 2A covering the contacting surface 4 of a first flexible mandrel 1A, a second sheet 2B covering the contacting surface 4 of a second flexible mandrel 1B, a third sheet 2C covering the first and second sheets 2A and 2B from the upper side, and a fourth sheet 2D covering the first and second sheets 2A and 2B from the upper side are combined together.

Subsequently, in a state in which the composite material is disposed between the pair of flexible mandrels 1, a vacuum bag process is performed in such a way that the entire assembly is covered by a bag to exhaust the air included therein (step S5). Subsequently, in a state in which the vacuum bag process is performed, a curing process is performed on the pair of flexible mandrels 1 having the composite material disposed therebetween (step S6). A curing process is performed in a high-temperature and high-pressure autoclave. When the ambient temperature in the autoclave increases, the composite material is heated by the heat transmitted via the flexible mandrel 1.

Figure 7:
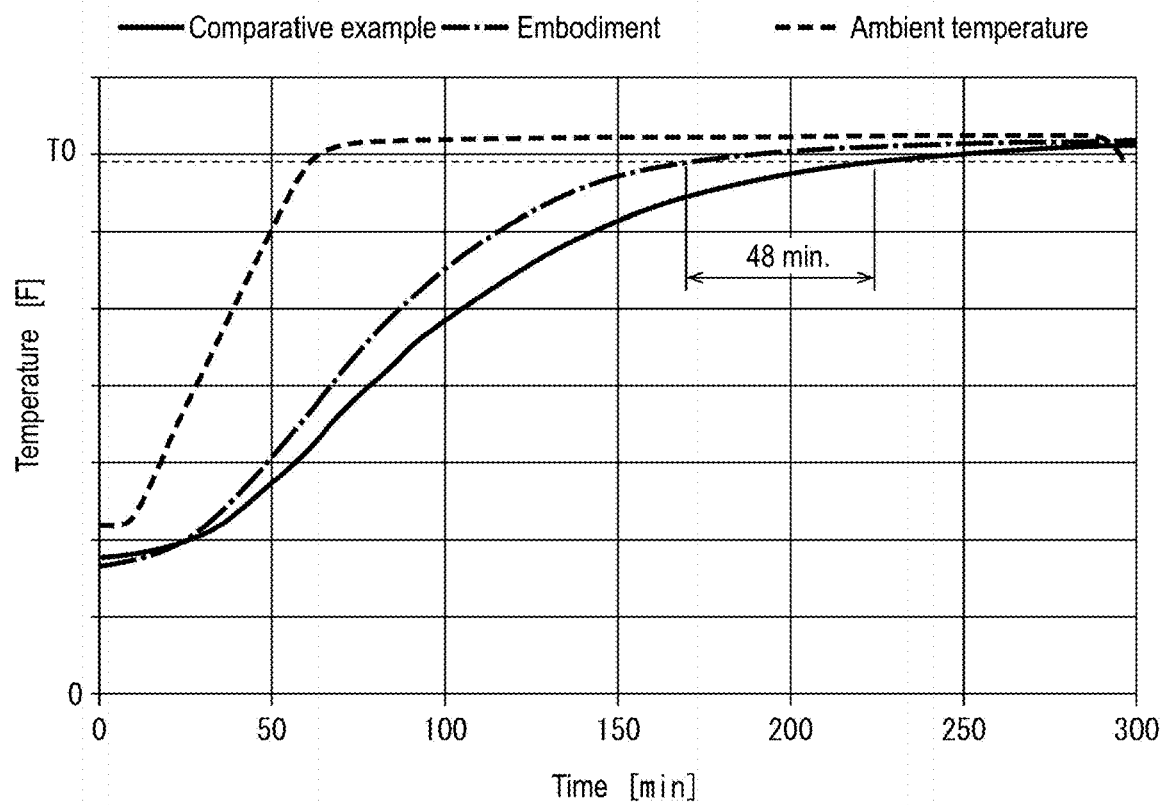
FIG. 7 is measurement results showing an internal temperature of the flexible mandrel illustrated in FIGS. 1 and 2 during a curing process and an ambient temperature inside an autoclave with the lapse of time.

Here, FIG. 7 is measurement results showing an internal temperature of the flexible mandrel 1 illustrated in FIGS. 1 and 2 during a curing process and an ambient temperature inside an autoclave with the lapse of time. In FIG. 7, a broken line indicates an ambient temperature in the autoclave and illustrates a state in which the ambient temperature increases gradually up to a target temperature T0 with the elapse of time. The internal temperature of the flexible mandrel 1 increases as the ambient temperature changes. A measurement result (a solid line) is a measurement result related to a comparative example (the same flexible mandrel as the flexible mandrel 1 of FIGS. 1 and 2 except that the thermally conductive layer 7 is not provided) without the thermally conductive layer 7, and a measurement result (a one-dot chain line) is a measurement result related to the flexible mandrel 1 of the present embodiment in which the hole 8 is formed. As illustrated in FIG. 7, in the present embodiment, the time at which the target temperature T0 is reached is approximately 48 minutes faster than the comparative example. This means that the temperature of the flexible mandrel 1 according to the present embodiment can be increased quickly due to the thermally conductive layer 7.

Figure 8:
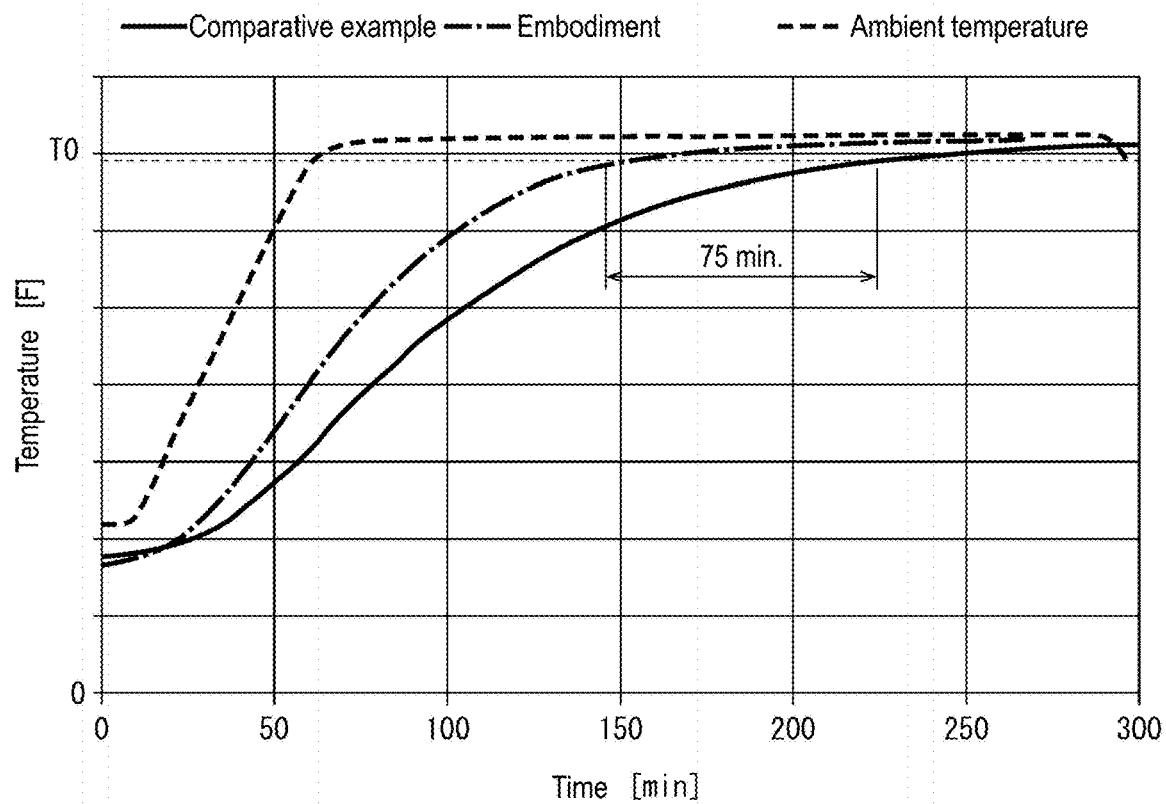
FIG. 8 is measurement results showing an internal temperature of the flexible mandrel illustrated in FIG. 3 during a curing process and an ambient temperature inside an autoclave with the lapse of time.

FIG. 8 is measurement results showing an internal temperature of the flexible mandrel 1 illustrated in FIG. 3 during a curing process and an ambient temperature inside an autoclave with the lapse of time. In FIG. 8, a broken line indicates an ambient temperature in the autoclave and illustrates a state in which the ambient temperature increases gradually up to a target temperature T0 with the elapse of time. The internal temperature of the flexible mandrel 1 increases as the ambient temperature changes. A measurement result (a solid line) is a measurement result related to a comparative example (the same flexible mandrel as the flexible mandrel 1 of FIG. 3 except that the thermally conductive layer 7 and the hole 8 are not provided) without the thermally conductive layer 7, and a measurement result (a one-dot chain line) is a measurement result related to the flexible mandrel 1 of the present embodiment in which the hole 8 is formed. As illustrated in FIG. 8, in the present embodiment (FIG. 3), the time at which the target temperature T0 is reached is approximately 75 minutes faster than the comparative example. This means that the temperature of the flexible mandrel 1 according to the present embodiment can be increased more quickly due to the thermally conductive layer 7.

In the curing process of step S6, since a state in which the temperature is increased up to the target temperature is maintained for a predetermined period, curing of the composite material progresses and molding of the composite component 2 is performed. When a curing process is completed, the bag is removed and the obtained composite component 2 is taken out of the bag (step S7).

As described above, according to at least one embodiment of the present invention, it is possible to decrease the heat capacity of a flexible mandrel by forming a non-penetration hole in a non-contacting surface of a main body of the flexible mandrel to shorten the time required for increasing the temperature during a curing process and achieve a satisfactory component production rate and a cost reduction.

INDUSTRIAL APPLICABILITY

At least one embodiment of the present invention can be used in a flexible mandrel used for molding a composite component containing a composite material such as CFRP and a method for producing a composite component using the flexible mandrel.

REFERENCE SIGNS LIST

1: Flexible mandrel
2: Composite component
3: Main body
4: Contacting surface
6: Non-contacting surface
7: Thermally conductive layer
8: Hole
12: Filling material

The invention claimed is:
1. A flexible mandrel for molding a composite material containing a thermosetting resin, comprising:
   a main body containing a first material; and
   a thermally conductive layer containing a second material having a higher thermal conductivity than the first material, the thermally conductive layer being formed so as to cover a circumference of the main body,
   wherein the thermally conductive layer extends from a contacting surface of the flexible mandrel, which comes into contact with the composite material during molding, to a non-contacting surface which does not come into contact with the composite material,
   wherein the second material contains a fiber material having an anisotropic thermal conductivity, and
   wherein the anisotropic thermal conductivity of the thermally conductive layer extends along a surface of the main body from the contacting surface to the non-contacting surface, such that the contacting surface orthogonally contacts the non-contacting surface in a fiber direction of the fiber material, the fiber direction extending along the surface of the main body from the contacting surface toward the non-contacting surface.

2. The flexible mandrel according to claim 1, wherein the fiber material is a PITCH-based CFRP.

3. The flexible mandrel according to claim 1, wherein the first material is a PAN-based CFRP.

4. The flexible mandrel according to claim 1, wherein the thermally conductive layer has a thickness smaller than 2 mm.

5. The flexible mandrel according to claim 1, wherein at least one hole is formed toward an inner side of the main body.

6. The flexible mandrel according to claim 5, wherein the hole is provided on a side of the non-contacting surface.

7. The flexible mandrel according to claim 5, further comprising:
   a filling material filling the hole,
   wherein the filling material has a higher thermal conductivity than the first material.

* * * * *